Sept. 1, 1931.  C. D. AMMON  1,821,371
LEAF GUARD
Original Filed March 10, 1930
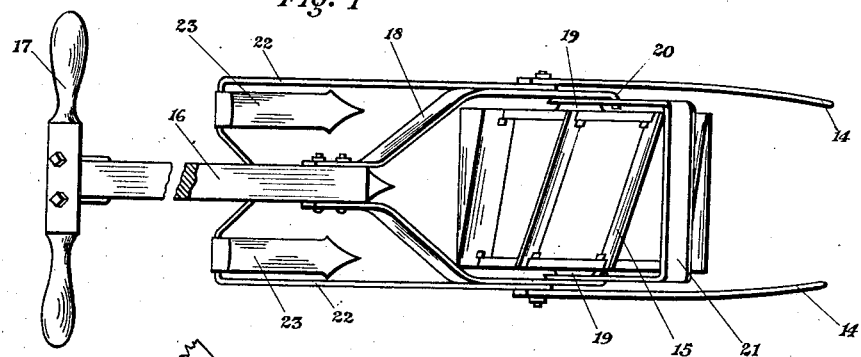
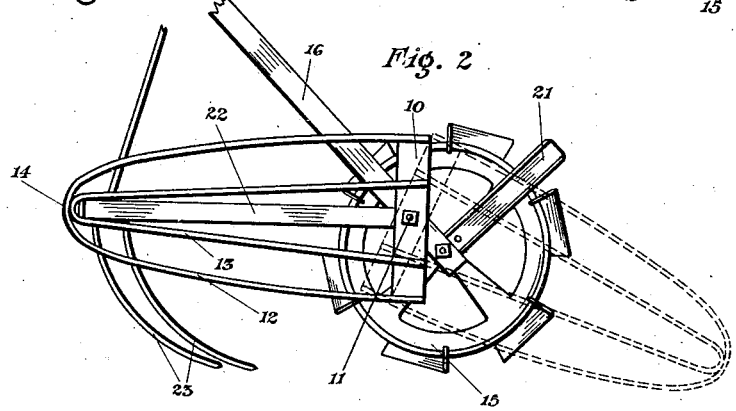
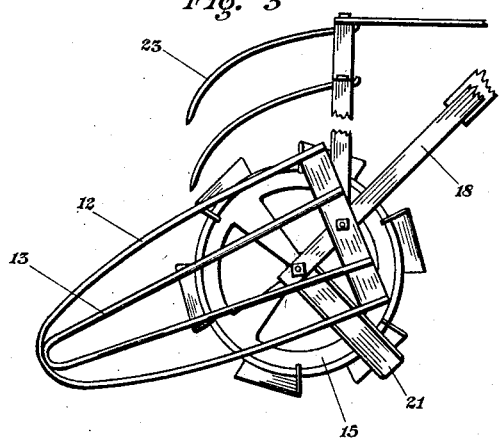
Inventor
C. D. Ammon
By Emil F. Lange
Attorney Patented Sept. 1, 1931

1,821,371

UNITED STATES PATENT OFFICE

CHARLES D. AMMON, OF LINCOLN, NEBRASKA

LEAF GUARD

Original application filed March 10, 1930, Serial No. 434,782. Divided and this application filed October 13, 1930. Serial No. 488,341.

This application is a division of my prior application for cultivators, Ser. No. 434,782, filed in the United States Patent Office on March 10, 1930.

The present invention relates to leaf guards and its primary object is the provision of an improved form of leaf guard which more effectively protects the plants in adjacent rows and prevents their being cut by the soil working tools.

Another of my objects is the provision of a leaf guard which is pivotally attached to an earth working implement in a manner such that it may occupy either of two operative positions or an inoperative position.

Another of the objects of the invention is the provision of a leaf guard which is light in weight and sufficiently resilient to not only protect the plants from the soil working tools but to also protect the plants from itself.

Another of my objects is the provision of a leaf guard in which the operative portion is formed from one or more rods or heavy wires which are bent into U-form and which are also bowed inwardly.

More specifically, the invention has for its object the provision of a leaf guard which is attachable to an earth working implement having three earth working tools in tandem and so arranged that the implement may be pushed with two of the tools in operative position, the leaf guard being adjustable whereby it may be operatively employed in either direction of propulsion of the implement or whereby it may be thrown into inoperative position.

Having in view these objects and others which will be pointed out in the following description, I will now refer to the drawings, in which Figure 1 is a top plan view of the implement with the leaf guards in operative position.

Figure 2 is a view in side elevation of a portion of the implement, the inoperative position of the leaf guard being shown in full lines and one of the two operative positions of the leaf guard being shown in dotted lines.

Figure 3 is another view in side elevation of the implement, showing the alternative operative position of the leaf guard.

The leaf guard includes a strap or bar 10 which is apertured at its middle point to receive a bolt or other pivot pin 11 whereby the leaf guard may be pivotally secured to the implement so that it is capable of being swung around to any of a number of operative or inoperative positions.

The leaf guard proper projects in one direction from the bar 10. In the present instance the leaf guard comprises a plurality of U-shaped members such as those shown at 12 and 13, the inner ends of the U-shaped members 12 and 13 being secured to the bar 10. The members 12 and 13 may be formed by bending light rods or heavy wire. At their free ends the members 12 and 13 are preferably secured together. The entire leaf guard consisting of the elements 10, 11, 12, and 13 is very light in weight and it is so formed that there are no projections to injure even the tenderest of plants in the row. The free end portions of the leaf guards are bowed in slightly as shown at 14 in Figure 1 so that the leaf guard will engage the plants gently and gradually to deflect the plants and their leaves away from the path of the soil working tool.

The above described leaf guard is adapted to be used wherever a leaf guard is necessary or desirable. It was, however, designed for use with the implement which is fully described in my copending application above referred to. The implement includes a chopping reel 15 which is propelled through a push bar 16 having suitable handles 17. The push bar 16 is connected to the reel 15 by means of two straps 18 which diverge from the handle and pass around on opposite sides of the reel, the reel being journaled at 19 to the straps 18. The lower end portions of the straps 18 are inturned at 20 to form a seat for the U-shaped hoe 21 which is secured in place by means of the reel axle and the inturned ends 20 of the straps 18.

The U-shaped frame 22 is secured to the straps 18 and it is provided with one or more cultivating tools 23. The soil working implements 15, 21 and 23 are therefore arranged in tandem relation but out of alignment. By swinging the push rod 16 in one direction or the other the reel 15 remains in operative position but one of the other two tools moves from operative to inoperative position, the operative position being in rear of the reel 15.

The leaf guard must travel in advance of the earth working tools regardless of which combination of tools is in use. Figure 3 shows the position of the leaf guard when the reel travels in advance of the hoe 21. The dotted line position in Figure 2 shows the leaf guard in advance of the reel when the cultivating tools 23 are in use. It occasionally becomes necessary or desirable, however, that the leaf guards be latched in inoperative position. This position is shown in Figure 2 in full lines. As before stated, the leaf guards are bowed in slightly at 14. In swinging them through an arc about their pivots 11, the ends 14 of the leaf guard are caused to bear against the side portions of the U-shaped frame 22 and when they are in this position they are frictionally held against the U-shaped frame 22 to prevent their assuming an operative position.

Having thus described my invention in such full, clear, and exact terms that its construction and operation will be readily understood by others skilled in the art to which it pertains, what I claim as new and desire to secure by Letters Patent of the United States is:

1. A leaf guard comprising a bar adapted for pivotal attachment at the side of an earth working tool and a looped member attached to said bar, said leaf guard being symmetrical about its longitudinal axis.

2. A leaf guard comprising a bar adapted for pivotal attachment to the side of an earth working tool and a symmetrical looped member attached at its extremities to said bar, said looped member being bowed inwardly at its free extremity.

3. A leaf guard comprising a bar adapted for pivotal attachment at the side of an earth working tool, a U-shaped looped member secured to said bar, and a member having parts proportionally spaced between the arms of said U-shaped member and secured to said bar and to said U-shaped member.

4. A leaf guard comprising a bar adapted for pivotal attachment at the side of an earth working tool and a pair of U-shaped looped members attached to said bar, one of said looped members being smaller in width than the other and being embraced thereby.

5. In combination with a cultivator adapted for operative propulsion in either of two directions, a leaf guard pivotally secured at the side of said cultivator, said leaf guard being pivotally adjustable into operative position for either direction of movement of said cultivator.

6. In combination with a cultivator adapted for operative propulsion in either of two directions, a leaf guard pivotally secured at the side of said cultivator, said leaf guard being pivotally adjustable into operative position for either direction of movement of said cultivator and being also adjustable into inoperative position.

7. A resilient leaf guard for chopping reels adapted to be propelled in either direction, said leaf guard being pivotally secured at the side of the chopping reel, said leaf guard being adjustable to project forwardly in either direction of movement of the chopping reel, said leaf guard being also adapted to be retained in inoperative position against a fixed portion of the frame of the chopping reel.

8. A resilient leaf guard adapted for pivotal attachment to implements having three soil working tools arranged in tandem and adapted for propulsion in either direction with the forward soil working tool in inoperative position, said leaf guard being adjustable to project forwardly in either direction of movement of the implement and being also adapted for retaining engagement in inoperative position against a fixed portion of the frame of the implement.

9. A leaf guard for chopping reels having earth working tools in front and in the rear and adapted to be pushed in either direction with the front earth working tool in inoperative position, said leaf guard being pivotally secured at the side of the chopping reel and being adjustable into operating position for either direction of movement of the chopping reel, said leaf guard being also adjustable into inoperative position.

In testimony whereof I affix my signature.

CHARLES D. AMMON.